US010871868B2

(12) United States Patent
Miura et al.

(10) Patent No.: US 10,871,868 B2
(45) Date of Patent: Dec. 22, 2020

(54) SYNCHRONIZED CONTENT SCRUBBER

(71) Applicant: APPLE INC., Cupertino, CA (US)

(72) Inventors: Britt S. Miura, Cupertino, CA (US); Andreas J. Karlsson, San Jose, CA (US); Daniel E. Gobera Rubalcava, San Jose, CA (US); Justin S. Titi, Morgan Hill, CA (US); Simon I. Bovet, Zurich (CH); Nicholas D. Lupinetti, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 463 days.

(21) Appl. No.: 14/732,457

(22) Filed: Jun. 5, 2015

(65) Prior Publication Data
US 2016/0357353 A1 Dec. 8, 2016

(51) Int. Cl.
| | |
|---|---|
| *G06F 3/0481* | (2013.01) |
| *G06F 3/0484* | (2013.01) |
| *G06F 3/0485* | (2013.01) |
| *G06F 3/0486* | (2013.01) |
| *G06F 3/0488* | (2013.01) |
| *G11B 27/10* | (2006.01) |

(Continued)

(52) U.S. Cl.
CPC .......... *G06F 3/0481* (2013.01); *G06F 3/0485* (2013.01); *G06F 3/0486* (2013.01); *G06F 3/0488* (2013.01); *G06F 3/04842* (2013.01); *G06F 3/04847* (2013.01); *G11B 27/031* (2013.01); *G11B 27/105* (2013.01); *G11B 27/34* (2013.01)

(58) Field of Classification Search
CPC .............. G06F 3/0481; G06F 3/04842; G06F 3/04847; G06F 3/0485; G06F 3/0486; G06F 3/0488; G11B 27/031; G11B 27/105; G11B 27/34
See application file for complete search history.

(56) References Cited

U.S. PATENT DOCUMENTS

| | | | | | |
|---|---|---|---|---|---|
| 6,006,227 | A | * | 12/1999 | Freeman | ........... G06F 17/30011 707/695 |
| 6,833,848 | B1 | * | 12/2004 | Wolff | ................... G11B 27/031 715/719 |

(Continued)

FOREIGN PATENT DOCUMENTS

| | | |
|---|---|---|
| WO | 2006/126050 A1 | 11/2006 |
| WO | 2006126050 | 11/2006 |

OTHER PUBLICATIONS

Tony Bove, "iPod & iTunes for Dummies", 2008, Wiley Publishing, Inc, 6th Edition, pp. 143-149.*

(Continued)

*Primary Examiner* — Nicholas Klicos
(74) *Attorney, Agent, or Firm* — Kilpatrick, Townsend & Stockton

(57) ABSTRACT

Systems, methods, and computer-readable medium are provided for presenting a synchronized content scrubber. For example, a user device may store digital content items for presentation on a screen of the user device. A user interface may be configured with multiple viewing areas. An image that represents a content item may be presented in the first viewing and the second viewing area. However, in the second viewing area, the image that represents the content item may be presented in a visually distinct manner from other images in the second viewing area.

17 Claims, 7 Drawing Sheets

(51) Int. Cl.
*G11B 27/34* (2006.01)
*G11B 27/031* (2006.01)

(56) References Cited

U.S. PATENT DOCUMENTS

| | | | | |
|---|---|---|---|---|
| 8,564,543 B2* | 10/2013 | Chaudhri | ............... | G06F 3/0482 345/173 |
| 9,753,630 B1* | 9/2017 | Kim | ............... | G06F 3/0485 |
| 2002/0000998 A1* | 1/2002 | Scott | ............... | G06F 17/30274 345/667 |
| 2002/0033848 A1* | 3/2002 | Sciammarella | ....... | G06F 3/0481 715/838 |
| 2005/0091596 A1* | 4/2005 | Anthony | ............ | G06F 3/04815 715/712 |
| 2006/0064716 A1 | 3/2006 | Sull et al. | | |
| 2006/0268100 A1* | 11/2006 | Karukka | ............ | G06F 3/0482 348/14.01 |
| 2006/0271867 A1* | 11/2006 | Wang | ............... | G06F 3/0482 715/764 |
| 2008/0024444 A1* | 1/2008 | Abe | ............... | G06F 3/0485 345/157 |
| 2008/0152299 A1* | 6/2008 | Ubillos | ............... | G06F 3/04812 386/333 |
| 2008/0307335 A1* | 12/2008 | Chaudhri | ............ | G06F 3/04817 715/764 |
| 2010/0058223 A1* | 3/2010 | Price | ............... | G06F 3/0362 715/784 |
| 2010/0281371 A1* | 11/2010 | Warner | ............... | G06F 9/4443 715/720 |
| 2011/0043696 A1* | 2/2011 | Onogi | ............... | H04N 5/44543 348/564 |
| 2011/0126156 A1* | 5/2011 | Krishnaraj | ............ | G06F 3/016 715/828 |
| 2011/0138313 A1* | 6/2011 | Decker | ............... | G06F 3/0481 715/777 |
| 2011/0234480 A1* | 9/2011 | Fino | ............... | G11B 27/005 345/156 |
| 2012/0072863 A1* | 3/2012 | Akifusa | ............ | G06F 3/0482 715/784 |
| 2012/0166950 A1* | 6/2012 | Frumar | ............... | G06F 3/04883 715/719 |
| 2013/0055082 A1* | 2/2013 | Fino | ............... | G06F 3/0485 715/716 |
| 2013/0307792 A1* | 11/2013 | Andres | ............... | G11B 27/005 345/173 |
| 2013/0332836 A1* | 12/2013 | Cho | ............... | G11B 20/10 715/723 |
| 2014/0195911 A1* | 7/2014 | Cho | ............... | G06F 3/0488 715/719 |
| 2014/0354845 A1 | 12/2014 | Molgaard et al. | | |
| 2015/0135134 A1* | 5/2015 | Circlaeys | ............ | G06F 3/0481 715/788 |
| 2015/0177933 A1* | 6/2015 | Cueto | ............ | G06F 3/0483 715/776 |
| 2015/0186002 A1* | 7/2015 | Suzuki | ............ | G06F 3/0482 715/830 |
| 2015/0309686 A1* | 10/2015 | Morin | ............... | G06F 3/0485 715/720 |
| 2015/0346975 A1* | 12/2015 | Lee | ............... | G06F 3/04845 715/765 |
| 2015/0346984 A1* | 12/2015 | Flint | ............... | G06F 3/04847 715/720 |
| 2016/0018983 A1* | 1/2016 | Bostick | ............... | G06F 3/0485 715/720 |
| 2016/0351229 A1* | 12/2016 | Liu | ............... | G11B 27/102 |

OTHER PUBLICATIONS

Tony Bove, "iPod & iTunes for Dummies", 2008, Wiley Publishing, Inc., 6th Edition, pp. iii-iv, 143-147 (Year: 2008).*
International Search Report and Written Opinion dated Nov. 28, 2016 in International Application No. PCT/US2016/031848. 19 pages.
International Application No. PCT/US2016/031848, Invitation to Pay Add'l Fees and Partial Search Report dated Aug. 31, 2016, 6 pages.

* cited by examiner

SYNCHRONIZED CONTENT SCRUBBER

BACKGROUND OF THE INVENTION

Consumer computing devices are utilized for many different tasks. For example, some devices are used for word processing tasks or multi-media projects. Consumer devices are often also used to run applications, manage calendar appointments, place telephone calls, as well as capture, store, and/or edit digital media content. As the number of applications and types of content that can be managed by such computing devices has grown, it become quite challenging to manage the presentation of associated content items.

BRIEF SUMMARY OF THE INVENTION

Embodiments of the present disclosure can provide systems, methods, and computer-readable medium for providing a synchronized content scrubber within a user interface. In some examples, a computing device (e.g., a mobile phone or other portable, handheld device) may store digital content that may be presented within a user interface. The digital content may be presented in such a way that particular content configured to be presented in the main viewing portion of the screen is also presented within a content scrubber. The content of the content scrubber may also be synchronized with the content of the main viewing area.

In some examples, a computer-implemented method for presented content in a user interface may be provided. The method may include identifying a plurality of digital assets (e.g., by a mobile phone or other consumer device). In some cases, the method may include generating the user interface with a first viewing area and a second viewing area. The method may include presenting, in the first viewing area, a first image that represents an asset of the plurality of digital assets and presenting, in the second viewing area, a second image that represents the asset in a visually distinct manner from other images that represent at least a subset of the plurality of digital assets that are also presented in the second viewing area. The method may also include identifying a location of a touch action on a touch screen of the mobile phone and determining, based at least in part on the location of the touch action, whether to animate the user interface based at least in part on a first mode of navigation or a second mode of navigation. In some cases, the method may also include synchronizing the first image presented in the first viewing area with the second image presented in the second viewing area based at least in part on the first mode of navigation or the second mode of navigation.

In some examples, the second viewing area may be configured to present an image scrubber interface for scrolling through the second image and the other images. Additionally, the image scrubber interface may be configured to present a video scrubber interface for scrolling through frames of a video asset of the plurality of digital assets, and the video scrubber interface may be presented adjacent to remaining assets of the plurality of digital assets presented in the image scrubber interface. In some cases, the visually distinct manner of presentation of the second image may comprise presenting the second image with buffering content on either side of the second image such that the second image is presented spaced further from the other images than the other images are spaced from each other. In some examples, the first mode of navigation may comprise movement of the first image being presented in the first viewing area synchronized in response to movement of the second image in the second viewing area when the location of the touch action is identified to correspond with the second image. Additionally, the movement of the first image may comprise moving the first image in a left or right direction at a same speed as the second image is controlled in the left or right direction and/or the first image may be changed to a third image of the other images in response to movement of the second image in the second viewing area out of a center location of a scrubber interface of the second viewing area and movement of the third image into the center location of the scrubber interface. The second mode of navigation may comprise movement of the second image being presented in the second viewing area synchronized in response to movement of the first image in the first viewing area when the location of the touch action is identified to correspond with the first image. Further, the first viewing area may be configured to be presented above the second viewing area.

In some examples, a computer-readable medium may be provided. The computer-readable medium may include instructions, that when executed, configure a processor to identify a plurality of assets and present a user interface with a first viewing area and a second viewing area. The processor may also present a first image, in the first viewing area, that represents a first asset of the plurality of assets and present a second image, in the second viewing area, that represents a second asset of the plurality of the assets in a visually distinct manner from at least a third image that represents one of a subset of the plurality of assets that are also presented in the second viewing area. The processor may also identify a selection of a location of the user interface and/or synchronize the first image presented in the first viewing area with the second image presented in the second viewing area based at least in part on the location of the selection.

In some cases, the first image may comprise the second asset that is presented in a visually distinct manner from at least the third asset. Additionally, each of the subset of the plurality of assets that are also presented in the second viewing area may not be presented in a visually distinct manner from each other and/or the first image may comprise at least one of the subset of the plurality of assets that is not presented in a visually distinct manner from each other. In some cases, at least one of the plurality of assets may comprise at least one of an image file, a video file, an audio file, or a set of image files and/or the first image, the second image, and the third image comprise thumbnail representations of at least one of the plurality of assets.

In some examples, a device configured to present content in a user interface may be provided. The device may include a touch screen configured to receive touch input, a memory configured to store computer-executable instructions, and a processor in communication with the memory and the touch screen. In some instances, the processor may be configured to execute the instructions to at least identify a plurality of assets and present the user interface with a first viewing area and a second viewing area. The processor may also present a first image, in the first viewing area, that represents a first asset of the plurality of assets and/or present a second image, in the second viewing area, that represents a second asset of the plurality of the assets in a visually distinct manner from at least a third image that represents one of a subset of the plurality of assets that are also presented in the second viewing area. The processor may also identify, by the touch screen, a selection of a location of the user interface and/or synchronize the first image presented in the first viewing area with the second image presented in the second viewing area based at least in part on the location of the selection.

In some examples, the processor may also identify, based at least in part on the location of the selection, a first or second mode of navigation and/or synchronize the first image with the second image based at least in part on the identified mode of navigation, where the second image may be presented in an image scrubber interface of the second viewing area that also presents the third image and other images that represent the subset of the plurality of assets. Additionally, the first mode of navigation may comprise presenting movement of the first image in the first viewing area synchronized in response to movement of the second image in the second viewing area when the location of the selection is identified to correspond with the second image, the third image, or the other images. In some examples, the presented movement of the first image in the first mode may include synchronizing a scroll of images through the first viewing area to match a speed of a scroll of the other images and/or presenting, in the first viewing area, a new image that corresponds to a particular image of the other images that is identified in a center of the image scrubber interface when the scrolling is complete. Further, in some cases, the first asset and the second asset may be a same asset of the plurality of assets such that the first image and the second image represent the same asset. Additionally, the first image may be presented in the first viewing area based at least in part on an aspect ratio of the same asset and/or the second image may be presented in the second viewing area based at least in part on an aspect ratio of other images presented in the second viewing area.

DETAILED DESCRIPTION

Figure 1:
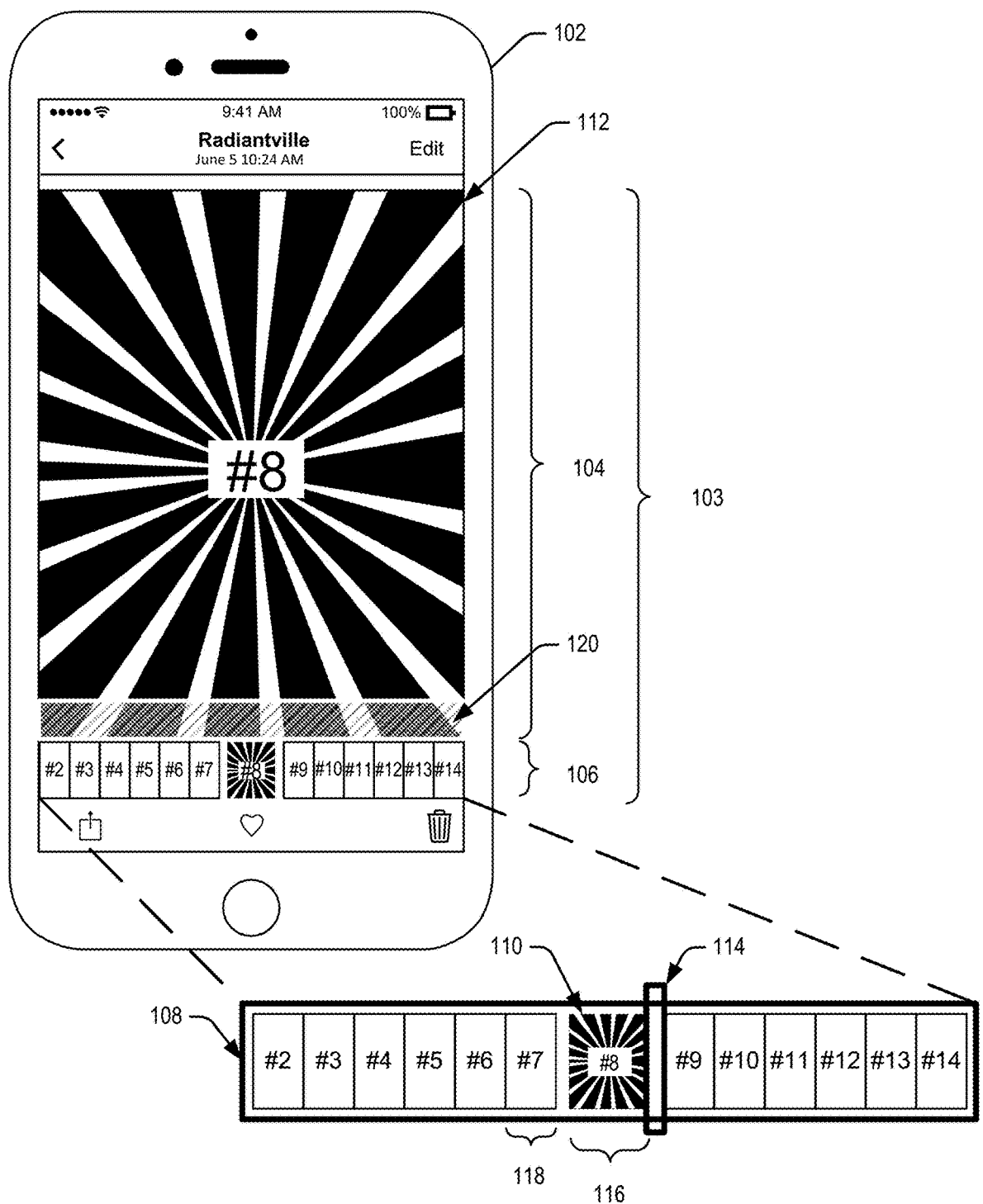
FIG. 1 is a simplified block diagram illustrating at least some example techniques for providing a synchronized content scrubber as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, providing a synchronized content scrubber within a user interface. In some examples, a computing device (e.g., a mobile phone or other portable, handheld device) may store digital content that may be presented within a user interface. The digital content may be presented in such a way that particular content configured to be presented in the main viewing portion of the screen is also presented within a content scrubber. The content of the content scrubber may also be synchronized with the content of the main viewing area.

Synchronization of the scrubber content and the main content may include presenting a larger version of the content in the main viewing area while a thumbnail image (e.g., smaller version) of the content is presented in the center of the content scrubber. Additionally, as a user interacts with the content scrubber and scrolls through the thumbnail images, the image shown in the main viewing area may be changed to match a thumbnail of the content scrubber that was selected or positioned in the center of the content scrubber. Alternatively, as the user interacts with the main content area (e.g., swiping the main image to the left or right to access the next image), the thumbnails of the content scrubber may be automatically scrolled in the appropriate direction to remain synchronized with the main image presented in the main viewing area.

In some examples, the content scrubber may be embodied as a single row (or column) of thumbnail images that correspond to each item (or a subset of items) of digital content stored on the device. The content scrubber may be configured with a limit regarding the total number of thumbnails that may presented at any given time. As such, the content scrubber may not present all of the items stored on the device, but instead, some subset of thumbnails that represent a corresponding subset of the items. For example, the device may have one thousand content items (e.g., image files, video files, audio files, etc.) stored thereon; however, the content scrubber may only present some smaller number of thumbnails. The user may, however, be able to access thumbnails that correspond to other content items that are not able to be presented in the content scrubber by scrolling left or right through the presented content. As the thumbnails are scrolled, the other thumbnails may become visible by being presented within the content scrubber, while the original subset of thumbnails go out of view of the content scrubber.

The content scrubber may be configured to present the thumbnail images in such a way that the particular thumbnail being synchronized (e.g., also presented in the main viewing area) may be presented in a visually distinct manner from other thumbnails in the scrubber. Thus, the particular thumbnail being synchronized can be easily identified by the user. Additionally, in some examples, depending on the type of content item, the content scrubber may be configured to provide additional functionality. For example, if the content item is a video file, the individual frames of the video file may be presented as separate thumbnails in the content scrubber. This can enable video content scrubbing within the content scrubber (e.g., moving from one from to the next within the single video file) while the main viewing area presents playback of the video file in accordance with the video content scrubbing. Alternatively, the video may be played back in the main viewing area in real-time (e.g., using the standard playback frame rate) or in accordance with some other playback speed that may correspond to the user's interaction with the content scrubber.

In some examples, the user interface may be well suited for use on a mobile device with a smaller screen (e.g., a mobile phone with a touch screen). For example, many mobile phones have less screen space for navigating through digital content. Thus, the content scrubber and main viewing area (including the described synchronization) may be especially helpful when there are significantly more content items to present than there is space to present those content items.

While examples are given where the computing device described herein is a mobile phone, any consumer electronic device may be configured to operate the features described herein. For example, the user device may be a smart watch, a portable audio or video device, a tablet computer, or the like. Further, while the content scrubber may be regularly described as presented in a horizontal orientation (e.g., at the bottom of the screen), it should be understood that any configuration or orientation may be presented. Additionally, while content items to be presented in the user interface may be described as being stored on the user device, the files may be stored anywhere that is accessible to the user device. For example, the files may be stored on a server computer and requested by the user device. Upon receipt from the server computer, the user device may present the images within the content scrubber and/or the main viewing area, as appropriate.

FIG. 1 illustrates an example computing device 102 that shows example implementations for providing the synchronized content scrubber described herein. In some examples, a user interface 103 may be configured to present content items in a first viewing area 104 and a second viewing area 106. The second viewing area 106 may be configured to present thumbnail images of digital content in a content scrubber 108. In some instances, the first viewing area 104 may be presented above (and/or adjacent to) the second viewing area 106. Additionally, as noted, the center thumbnail 110 of the content scrubber 108 may represent a particular content item (e.g., image #8) that is also presented in the first content area 104. As such, even independent of motion on the user interface 103, the presentation of image #8 is synchronized (e.g., it is the center thumbnail 110 of the content scrubber 108 in the second viewing area and, at the same time, it is the main image 112 of the first viewing area 104. However, the content scrubber 108 is also synchronized in that if a user scrolls through the thumbnails and changes the center image to image #7, image #7 will then be presented in the main viewing area 104. Additionally, while the thumbnails are being scrolled (e.g., animated in a way that makes them appear to be moving to the right), image #14 will appear to disappear or move out of the content scrubber 108, image #1 will appear to move into the content scrubber 108, image #8 will appear to move out of the center position of the content scrubber 108, and the version of image #8 presented in the first viewing area 104 will be presented in such a way that it will appear to move out of the main viewing area 104 at the same speed, rate, etc., as image #8 moves out of the center position of the content scrubber 108.

In some examples, one thumbnail image (e.g., the center thumbnail 110) of the content scrubber 108 may be presented in a visually distinctive manner from the other thumbnails (e.g., image #2-#7 and image #9-#14). The visual distinctiveness may include being in the center of the content scrubber 108 (e.g., being the center thumbnail 110), being the first thumbnail image in the content scrubber 108 (e.g., image #2), being the last thumbnail image in the content scrubber 108 (e.g., image #14), or being in any other position. The visual distinctiveness may also include having a user interface element 114 on either side of the visually distinct image. For example, the user interface element 114 may be virtual padding, some interface buffer, a virtual space, or any other graphical user interface element that might make the thumbnail image look different from the others. In some cases, the visual distinctiveness may include being larger in size than other images. For example, as shown in FIG. 1, the center thumbnail 110 is wider (seen by width 116) than the other thumbnail images (seen by width 118). Alternatively, or in addition, the visual distinctiveness may include the particular thumbnail being a different color than the others. For example, the center thumbnail 110 may be a black and white (or color) image, while the other images may be greyed, muted, or otherwise presented in a way that makes them appear less prominent.

The user interface 103 may enable scrolling through the one or more thumbnail images presented within the content scrubber 108. In some examples, as noted, particular content items may represented in multiple locations at the same time (e.g., image #8 is presented as the main image 112 and the center thumbnail 110 of the content scrubber). Additionally, the content scrubber 110 may enable a user to select other content items to be presented as the main image 112. A user may select a new content item for presentation as the main image 112 by tapping or otherwise selecting any thumbnail in the content scrubber 108. For example, if a user selects (e.g., by tapping) image #13, the content scrubber may animate the content scrubber 108. One example of such an animation may include all of the thumbnail images in the content scrubber (e.g., images #2-#14) sliding to the left, image #8 changing shape so that it becomes the same width 118 as the other thumbnails, image #13 moving into the center position 110, and image #13 becoming visually distinct from the other thumbnail images (e.g., the padding 114 may be added on both sides of image #13).

While scrubbing (scrolling), some of the images on the left of image #8 may disappear from the content scrubber 108 (e.g., if they no longer fit in the content scrubber 108) or may become smaller (e.g., decreased width) so that they still fit in the content scrubber 108. Further, as the thumbnail images slide to the left, the main image 112 will be updated in real-time to present an animation showing representations of the thumbnail images sliding to the left, such that each thumbnail that is presented in the center position 110 of the content scrubber 108 is presented as the main image 112, and each transition is animated as well. In other words, as image #9 slides in and out of the center position 110 of the content scrubber 108, the main image 112 will animate the transition of the image #9 coming from the right (e.g., presenting only the left portion of image #9), into the center (e.g., presenting all of the image #9), and the transition of the image #9 leaving the main viewing area 104 to the left (e.g., presenting only the right portion of image #9). The speed of the image transition of image #9 (or of any image that is presented transitioning in and/or out of the main viewing area 104) may be proportional and/or synchronized with the speed of the scrolling of the content scrubber 108. In some examples, the speed of the scroll of the content scrubber 108 may accelerate based on the speed and/or rapidity with which the user slides the thumbnail images. An inertial calculation may be made to translate the user's scroll command into a particular scroll speed and/or scroll distance. Once the inertial speed and/or distance are reached, the scroll speed may reduce at a gradual pace until the content scrubber 108 stops scrolling.

The user interface 103 may be configured with several different modes of operation. One mode of operation may be responsible for animating the user interface 103 when a user attempts to scroll through the content by dragging the main image 112 to the next content item (e.g., the next item in a library of the device/user or stored on the device/cloud). in this mode of operation, as the main image 112 (e.g., image #8) is dragged to the left, the entire content scrubber 108 will be synchronized such that the movement of the main image 112 is mirrored in the content scrubber 108. In other words, if image #8 is dragged to the left such that 10% of image #8 disappears from the main viewing area 104, the center thumbnail 110 of the content scrubber 108 will also move to the left such that 10% of the image #8 is no longer in the center of the content scrubber. In some examples, once the user begins dragging the main image 112, the visual distinctiveness of the center thumbnail 110 may disappear (e.g., such that all thumbnails in the content scrubber 108 will have the same width and/or look similar (standard)). Once the next image is fully within the main viewing area 104 (e.g., image #9), the content scrubber 108 may update the visual distinctiveness of the thumbnail #9 such that the new image in the center position 110 includes the virtual buffer 114.

A different mode of operation may be responsible for animating the user interface 103 when a user attempts to fast scroll by swiping the main image 112. In this example, the user may drag the main image 112 and then release with a particular amount of speed/force. As noted above, a particular scroll speed and/or distance of scroll may be calculated, and the user interface 103 may be animated to visually represent an inertial scroll of the content items. In this example, the content scrubber 108 may be animated in such a way to mirror the speed and distance of the scroll of content items. As images that represent content items quickly come in and out of the main viewing area 104, the corresponding thumbnail images may be presented as entering and quickly exiting the center position 110 of the content scrubber. Once the inertial scroll ends, the thumbnail that is closest to the center position 110 may snap into the center position 110 of the content scrubber. Additionally, the virtual buffer interface element 114 may presented on either side of the new center thumbnail 110 such that the new center thumbnail (which matches the main image 112) becomes visually distinctive from the other thumbnails in the content scrubber 108.

Another mode of operation may be responsible for animating the user interface 103 when a user attempts to drag a thumbnail of the content scrubber 108, without releasing the thumbnail that was selected for the drag. In this mode, once the user begins dragging the thumbnail images, the visual distinctiveness may disappear, and at each moment, the main image 112 may be synchronized to match up with whichever thumbnail image is in the center position 110 at that moment. This may be the case even when no visual distinctiveness is present, and the user is still scrolling. In other words, the animation of the main image 112 may not show the transitions or the speed of movement of the thumbnail images, and the main image 112 may only change to the next image when each thumbnail image is near the center position 110 of the content scrubber 108. However, in other examples, the animation of the main image 112 may be presented in such a way that the transitions to and from the center position 110 of each thumbnail is illustrated within the main viewing area 104. In some examples, once the user releases the content scrubber 108 (e.g., the drag portion of a drag and drop command), the thumbnail nearest the center position 110 may snap to the center position, become the center thumbnail 110 and be presented visually distinct from the other thumbnails of the content scrubber 108.

Similarly, in another mode of operation, when a user attempts to perform a fast scroll of the thumbnails in the content scrubber 108, the main image 112 may only change for each instance that a particular thumbnail is near the center position 110 of the content scrubber 108. In this way, a fast scroll of thumbnails won't result in a poor user experience with many images transitioning in and out of the main viewing area 104 at a rapid rate. Additionally, in some examples, while the user is scrubbing through the thumbnails of the content scrubber 108, each thumbnail image may be presented with an equal (standard) aspect ratio and/or size (e.g., width). However, when the scrubbing ends (e.g., the user may place a thumbnail in the center position 110 or the inertial scroll may end on its own), the center thumbnail 110 may expand to match (e.g., proportionally) the aspect ratio of the content item being represented. For example, if image #8 is 2×1 (e.g., two inches tall by one inch wide), the thumbnail that represents image #8 may be presented as the same size as all of the other thumbnails during a scrub of the thumbnails, even if the other content items are not 2×1. Yet, once the scrubbing is over, the thumbnail representing image #8 may be expanded to be presented with a 2×1 ration in the content scrubber 108 (and, in some examples, in the main viewing area 104). However, in some cases, the expanded thumbnail may be configured with a maximum or minimum amount of expansion such that it may not always be expanded to its full ratio.

In some examples, the standard or consistent size of all thumbnail images presented while scrubbing may include the middle third of each image that represents the content item. In this way, a visual representation of the content item may be recognizable, even when the size of the thumbnail is not proportional to the actual content item. Additionally, in one of the operation modes, a user may select a thumbnail of the content scrubber 108 by tapping on the thumbnail. One animation may include having the tapped image snap to the center position 110, slowly expanding to its actual proportion while moving to the center position, having the main image 112 snap to an image corresponding to the tapped content item, and having the center thumbnail 110 move its appropriate position in the content scrubber while slowly contracting to the standard shape that is not visually distinctive from the other thumbnails. Further, a user may dynamically adjust the size of neighboring assets (content items) by pressing and holding contact on a particular thumbnail of the content scrubber 108. While maintaining contact with the thumbnail, the neighboring assets may slowly become narrower and narrower so that a larger number of the assets may be presented (will fit) within the content scrubber 108.

In some examples, a buffer space 120 may be provided within the user interface 103 just above (or below) the content scrubber 108 for dragging and or controlling the content scrubber 108. In this way, the user may control the content scrubber 108 without placing their finger on the content scrubber 108 itself; keeping the content scrubber 108 visible even while interacting with it. For example, the user interface 103 may identify a touch of a user (e.g., via the touch screen of the mobile device 102. If the touch of the user is identified within the buffer zone 120, the user interface 103 may identify that the user is attempting to interact with the content scrubber 108 even though the touch was not identified on the scrubber interface 108 directly. As noted, the buffer zone 120 may be any space above or below the content scrubber 108. Additionally, the buffer zone 120 may be configurable by the user. For example, on a settings page associated with the user interface 103, the user may configure the size and/or location of the buffer zone 120. Further, in some examples, the thumbnails of the content buffer 108 may all contract to the standard size while the touch of the user is identified and/or maintained (e.g., when the user is touching the buffer zone 120 or the content buffer 108 itself). Once the user releases the touch, a thumbnail nearest the center location 110 may snap to the center location 110, may expand and may become visually distinct, while the main image 112 may be presented to correspond with the new center thumbnail 110. However, in another example, the thumbnail under the user's touch (e.g., under the user's finger) may snap to the center location 110, become the center thumbnail 110, and expand and become visually distinct (e.g., instead of the thumbnail nearest the center location 110). In this other example, the main image 112 may be presented to correspond to the thumbnail that was under the user's touch and is now at the center position 110 of the content buffer 108.

Figure 2:
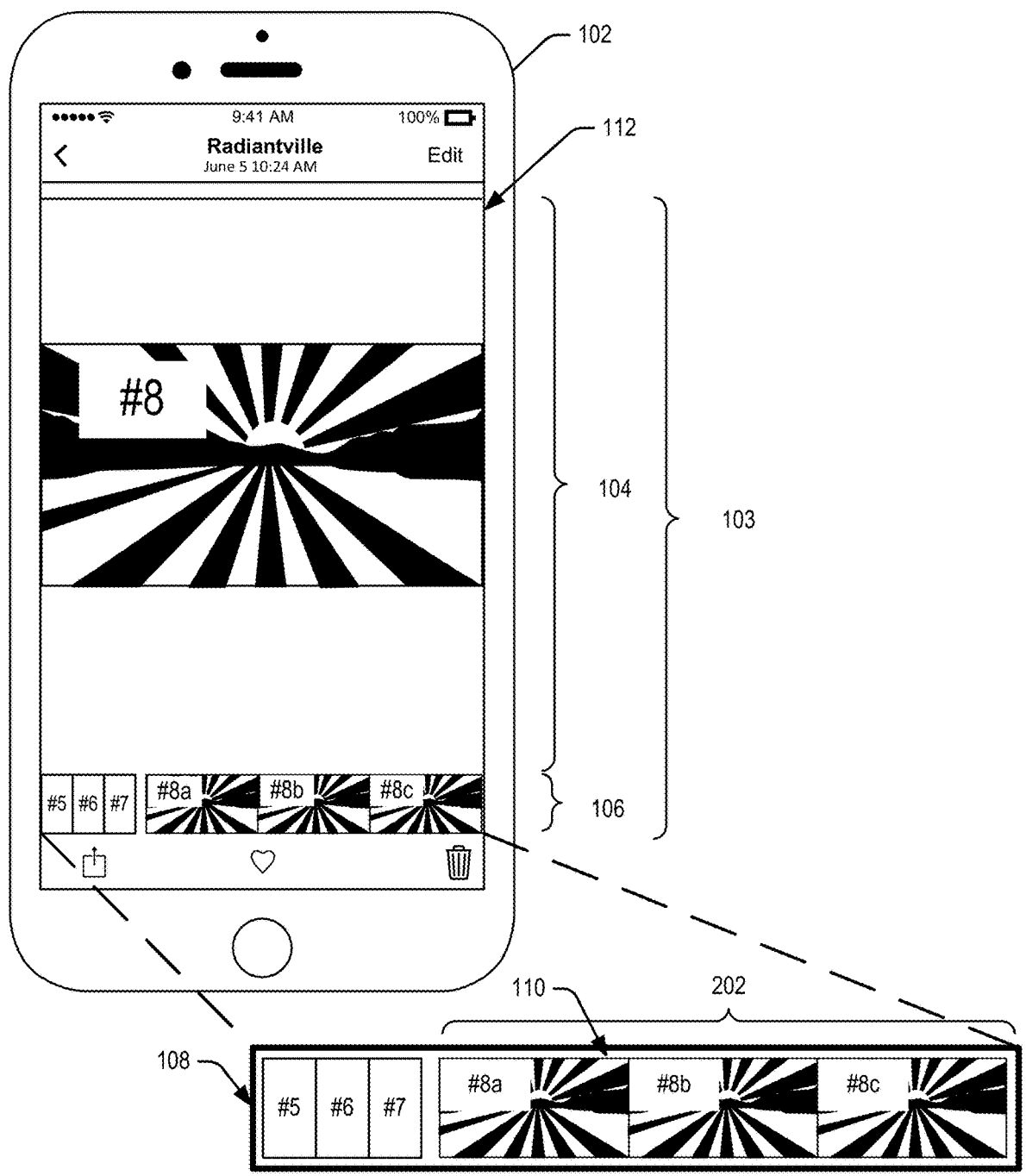
FIG. 2 is another simplified block diagram illustrating at least some example techniques for providing a synchronized content scrubber as described herein, according to at least one example.

FIG. 2 illustrates the example user interface 103 presented on the example computing device 102 that shows example implementations for providing the synchronized content scrubber described herein. In some examples, one or more of the content items may be a video file 110. In some cases, the video files may be made up of one or more frames, each of which may be presented as thumbnail images within the content scrubber 108. For example, a video file may be represented as image #8 in the content scrubber 108. As noted above, while scrolling (scrubbing) through the thumbnail images of the content scrubber, each thumbnail may be presented at a standard size. As such, in FIG. 2, each of images #5-#8 could all be video files. However, it may not be apparent that each video file has individual frames to scroll through until the thumbnail is in the center location, has otherwise been selected, and/or is also presented in the main viewing area 104. In the example of FIG. 2, it is assumed that the user has already selected content item #8 for presentation in the main viewing area 104.

In this example, at least one of the frames of content item #8 is presented in a visually distinct manner. Much like in FIG. 1, the thumbnail that is being presented twice (once in the main viewing area 104 and once in the content scrubber 108 (second viewing area 106)) may include one or more buffer interface elements. Here, the buffer interface element is presented between the frame #8a and thumbnail #7. In any event, once a video file is identified in the content scrubber, a second scrubber interface may be configured and/or presented within the content scrubber 108. That is, a video scrubber 202 may be presented within the content scrubber 108 (e.g., frames #8a-#8c). Here, using the video scrubber 202, the user may scrub through frames within the content item #8 to find a desired location within the video file. In some examples, the main image 112 may be a thumbnail of the image file that corresponds to the first frame or any frame within the video file (e.g., the middle frame). An icon may be presented over the main image 112 to indicate that this image corresponds to a video file (e.g., a triangle may be presented over the image #8 in the main viewing area 104). By tapping the triangle, anywhere in the main viewing area 104, or on a "play" icon somewhere within the user interface 103, the user interface 103 may be instructed to play the video. Once tapped, the main viewing area 104 may animate (play) the video in real-time. In some examples, while the video is playing in the main video area 104, the video scrubber 202 within the content scrubber 108 may scroll through the video frames synchronously such that the thumbnail presented in the center of the content scrubber (or the frame that is visually distinct) is presented at the same time that the corresponding frame is played in the main viewing area 104.

In some examples, the user may scrub through the frames of the video scrubber 202 to locate a desired position within the video. While scrubbing, if the user reaches the beginning or the end of the video (e.g., first or last frame of the video file), the video scrubber 202 may animate a bounce of the frames (e.g., the frame that is moving may go past its natural end location and then bounce back to the end location). This will signify that the user has reached a boundary of the set of frames that make up the video file. Additionally, in some examples, if the user selects another thumbnail in the content scrubber 108 (e.g., thumbnail #5 or any thumbnail other than one of the video frames), the entire video scrubber 202 (including corresponding frames) may contract back to the standard thumbnail size while the selected thumbnail will take the center position and the main viewing area 104 will be updated to present the corresponding content item. If thumbnail #5 is selected, and thumbnail #5 happens to be a video file, the video scrubber 202 will open back up to present the frames of the thumbnail #5 and an image that represents the video #5 will be presented in the main viewing area 104.

In some examples, the size of the video scrubber 202 (e.g., within the content scrubber 108) may be determined based at least in part on a non-linear mapping between the video length and the width of the video scrubber 202. As such, when a video is very long, not all of the frames of the vide will fit within the video scrubber 202. In some cases, the video scrubber 202 may take up the entirety of the content scrubber 108. If this is the case, the user may need to proceed to the first or last frame of the video file, where the end/beginning frame will bounce, in order to see the previous or next content item (asset). Once the previous or next asset is visible in the content scrubber 108, the user may select it to contract the video scrubber 202 and/or scrub through the other content items that may be available. Alternatively, the user may contract the video scrubber 202 (in this example where the video scrubber 202 takes up the entire content scrubber 108) by swiping the video image in the main viewing area 104. However, in other examples, the next and/or previous content items of the content scrubber 108 may always be visible on either ends of the video scrubber 202 (e.g., even when the video length is long).

In some examples, while a video is being played back in the main viewing area 104, the user may be able to control the playback speed by interacting with the video scrubber 202. For example, the video file may be playing at a regular (or desired) playback speed in the main viewing area 104. If the user touches the video scrubber 202 on a particular frame, and holds their finger on that frame, the video playback will slow down (e.g., presenting that frame) to a speed that is now under the control of the user. Dragging the frame forwards within the video scrubber 202 may advance the video playback at the speed of the movement of the finger. Similarly, dragging the frame backwards may rewind the video playback at that speed. Alternatively, by scrubbing through the frames, the user may control the speed of the playback independent of which frame is under the finger of the user. In other words, the speed of the interaction with the video scrubber 202 may indicate the desired speed of the video playback and the frame selected may not correspond to the frames being played. Once the user releases their finger from the video scrubber 202, the video may resume regular playback. Additionally, if given inertia in the video scrubber 202, while the vide is playing in the main viewing area 104, the video scrubber 202 may scan through the video at a fast rate, until a point is reached, then it will being to slow back to the regular playback rate (e.g., real-time) and resume playback.

In some examples, while a video image (or playing video) is being presented in the main viewing area 104, a user may swipe the image in the main viewing area 104. After a certain threshold distance, the video scrubber 202 may collapse to the standard thumbnail size, even without the user releasing their finger from the main viewing area 104. If the user keeps their finger on the main image, they can control the main image back and forth (partly out of and then in view of the main viewing area) and the video scrubber 202 may collapse and then expand synchronously with the movement of the main image. In some case, the video may continue to play through this interaction. Additionally, once the user releases the main image (during the back and forth interaction), the video scrubber 202 may maintain the state it had when the user released (e.g., if the user released while the video scrubber 202 was contracted it would remain contracted). The user's intent regarding whether to close the video scrubber or not may be assumed based at least in part on the threshold distance in or out of the main viewing area 104. This determination of assumed intent may be based at least in part on the user maintaining the touch, an amount of time, and/or a threshold distance past the center of the main viewing area 104. Additionally, in some examples, when a video file is relatively long, a user may tap and hold a frame within the video scrubber 202 to dynamically adjust the size of the video scrubber 202 and/or the size of each thumbnail frame.

Figure 3:
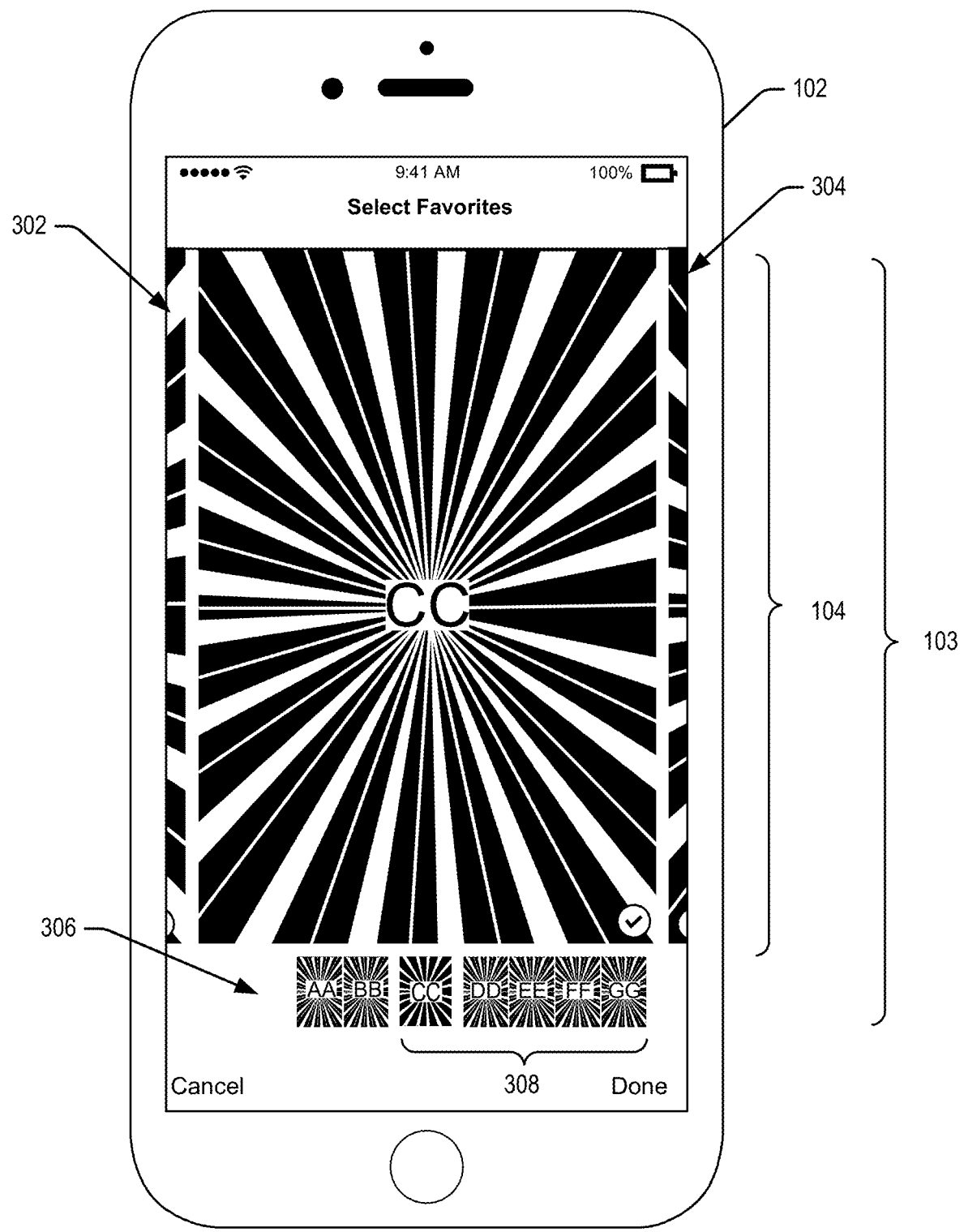
FIG. 3 is another simplified block diagram illustrating at least some example techniques for providing a synchronized content scrubber as described herein, according to at least one example.

FIG. 3 illustrates the example user interface 103 presented on the example computing device 102 that shows example implementations for providing the synchronized content scrubber described herein. In some examples, the main viewing area 104 may present more than just the synchronized content from the content scrubber. Here, as seen by the edges of previous content item 302 and next content item 304, the main viewing area 104 may also present at least parts of the adjacent content. For example, the previous content 302 may correspond to thumbnail BB of the content scrubber 306 while the next content item 304 may correspond to thumbnail DD of the content scrubber 306. Thus, if the user drags the main image CC to the right or left, at least a portion of the next or previous images may be already be visible. As noted, the content scrubber 306 and the image presented in the main viewing area 104 may be synchronized. In some cases, the content scrubber 306 may only be presented based at least in part on a threshold number of assets existing in an asset folder, user or device library, or the like. Alternatively, or in addition, the content scrubber may be presented based at least in part on the size of the screen of the computing device 102. For example, the content scrubber may only take up a particular portion or percentage of the screen. However, in some examples, the video scrubber may be presented when video is being played back, even if the above thresholds (screen size, number of content items, etc.) are not met. Further, the user can hide, move, or otherwise configure the content scrubber and/or the video scrubber in any way desired (e.g., the location, the size, and/or the functionality of the scrubber interfaces may be changed or otherwise configured (set) by the user). However, in some cases, the scrubber interfaces may be configured to never block the view of the presentation in the main viewing area 104.

Other types of content items that may be presented in the user interface 103 include audio files and/or image bursts. An image burst may be a set of image files that were all captured at about the same time (e.g., utilizing a single image capture selection). In some examples, image burst files may be treated similarly to video files. For example, the individual images (frames) of the burst file may be scrubbed or individually viewed utilizing a scrubber interface such as the burst scrubber 308. As such, the user may quickly browse or scroll through the individual images of the burst file using the burst scrubber 308 without losing their place within the order of the other content items in the content scrubber 306. Similarly, audio tracks may be scrubbed using the one of the secondary scrubbers (e.g., video scrubber 202, burst scrubber 308, etc.). Additionally, in some examples, content items that are made up of combinations of video plus audio, image plus audio, burst of images plus audio, etc., may be scrubbed using the video scrubber 202, the burst scrubber 308 or some other scrubber interface within the content scrubber 108, 306. In some examples, whenever the content item is more than an image (e.g., a video, an audio track, a burst of images, any combination or the like), the video controls and/or the respective scrubber interfaces may disappear during the playback of the content item. The controls may then reappear once the user touches anywhere on the screen.

Figure 4:
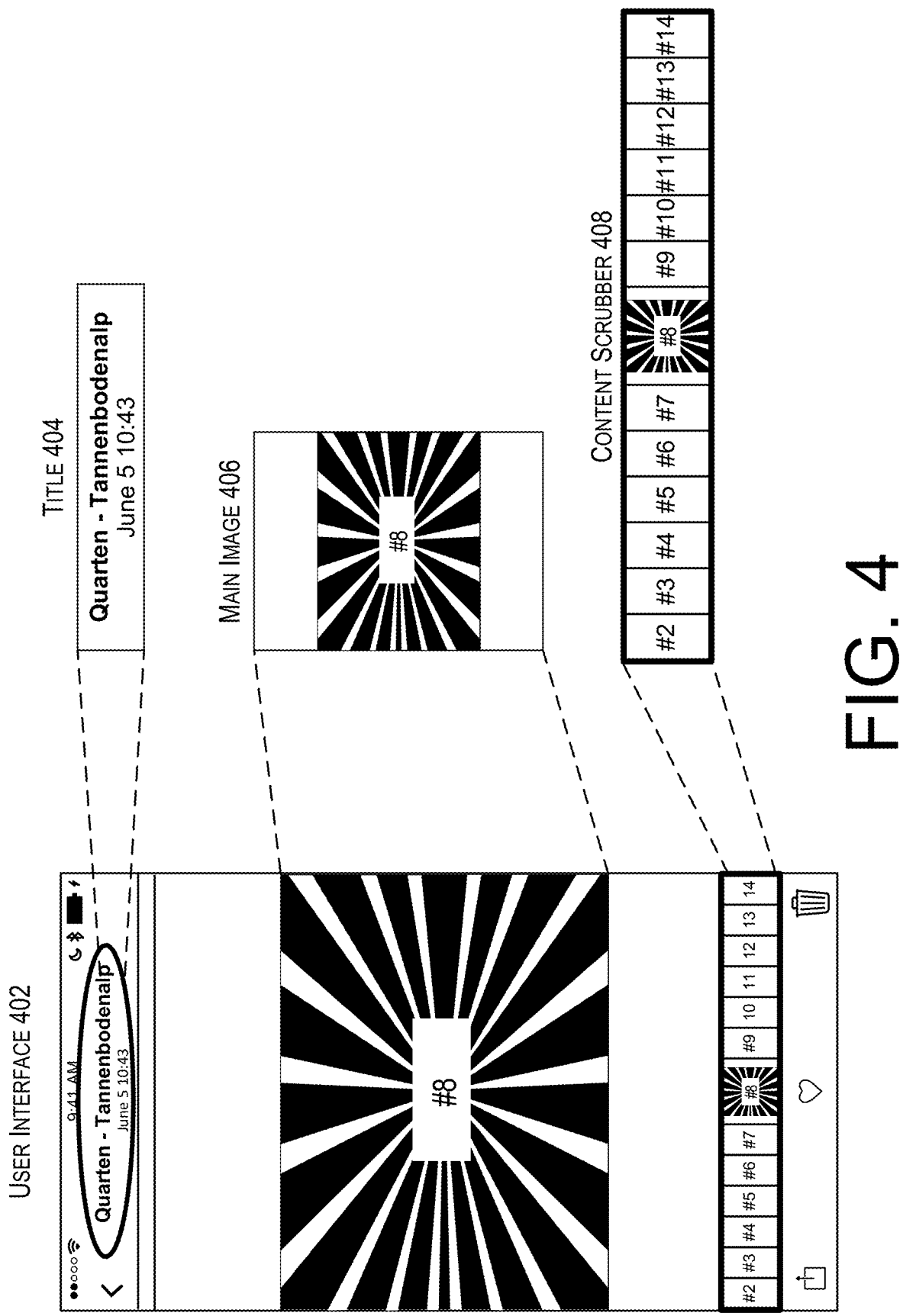
FIG. 4 is another simplified block diagram illustrating at least some example techniques for providing a synchronized content scrubber as described herein, according to at least one example.

FIG. 4 illustrates another example user interface 402 that shows implementations for providing the synchronized content scrubber described herein. In some examples, a view model framework may be utilized to enable seamless synchronization between user interface components of the interface 402. For example, the user interface 402 may be made up of one more user interface components including, but not limited to, a title interface 404, a main image interface 406, and/or a content scrubber interface 408. In some aspects, each component may request and/or receive data from a view model module independent from each other. In other words, the components may not be aware of the existence of each other, thus enabling new components to be added and current components to be deleted without affecting the overall performance and/or synchronization of the user interface 402 as a whole. In some cases, each component may receive state information from the view model module independent of the others, and may present appropriate content based at least in part on the state information.

In some cases, user interface operations may be executed and then interrupted in the middle of execution by the next user interface operation (e.g., based at least in part on a new animation request). For example, a user may tap in various places on the screen (e.g., with each tap indicating a new animation request) and a new animation may begin at each tap without the previous animation completing. That is, the user interface 402 may be configured to be always transitioning from a current state to a most recently requested state.

In some examples, each of the components may observe and/or request state information for itself from the view model module. When a particular component is driving a change in state, the other components will receive updates so that they can present appropriate images, animations, transitions, etc., based at least in part on the changed state information. For example, as a user interacts with the content scrubber 408, the content scrubber component 408 may provide state information to the view model module.

The view model module may update the state of the content scrubber as well as the appropriate states for each of the other components. As such, when the main image component 406 requests state, the view model module may provide the most updated state to the main image component 406. the main image component 406 would then update its state to match (synchronize) with the content scrubber component 408. Similarly, the title component 404 may be updated appropriately as well so that the correct title is presented for each content item presented by the main image component 406.

While the title of the content item is shown in FIG. 4 as being presented by the title component 404 at the top portion of the user interface 402, this labeling information may instead be presented in various other locations. For example, the title, date, time, etc., information may be presented as part of (integrated within) the content scrubber 408. For example, there may be dividers with the title information, the title information may be presented hovering (floating) over the content scrubber 408, or it may be presented at the boundary of the next content item.

Figure 5:
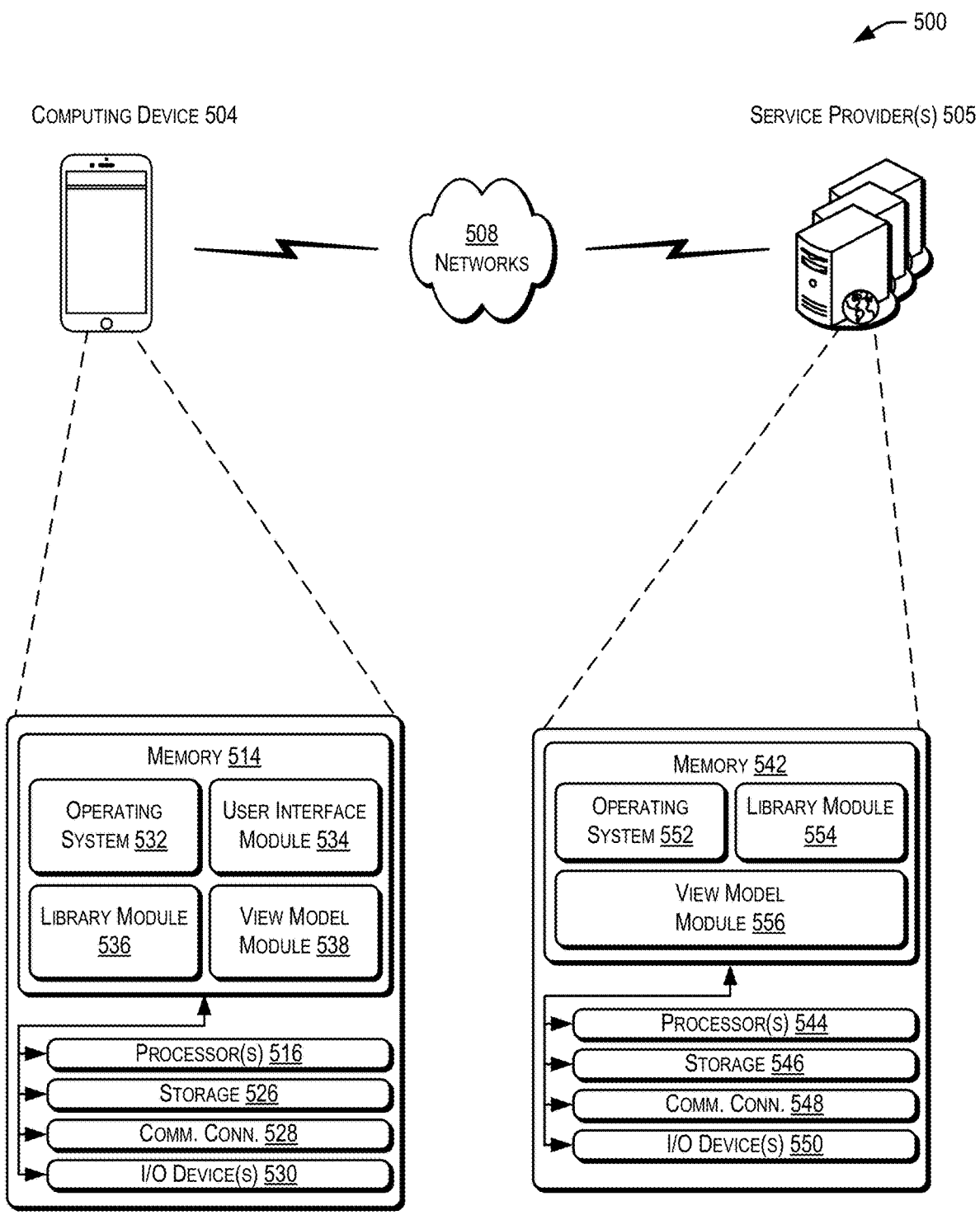
FIG. 5 is a simplified architecture diagram illustrating at least some example techniques for providing a synchronized content scrubber as described herein, according to at least one example.

FIG. 5 illustrates an example architecture or environment 500 configured for providing the synchronized content scrubber described herein. In some examples, a computing device 504 of the example architecture 500 may be configured to potentially interact with one or more service providers and/or service provider computers 505. In some examples, the devices may be connected via one or more networks 508 (e.g., via Bluetooth, WiFi, the Internet, or the like). In the architecture 500, one or more users may utilize the computing device 504 to present content items in a user interface.

In some examples, the networks 508 may include any one or a combination of many different types of networks, such as cable networks, the Internet, wireless networks, cellular networks, satellite networks, other private and/or public networks, or any combination thereof. While the illustrated example represents the computing device 504 accessing the service provider computers 505 via the networks 508, the described techniques may equally apply in instances where the computing device 504 interacts with the service provider computers 505 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the computing device 504 may be configured to execute or otherwise manage applications or instructions for presenting content items such as, but not limited to, image files, video files, audio files, image burst files, combinations of the foregoing, or the like. The computing device 504 may collect the content items via one or more image, video, and/or audio collection devices (e.g., cameras, microphones, etc.). The computer device may also receive the content items from the service provider computers 505, other computing devices, or the like via the networks 508. The computing device 504 may then present the content items to the user (e.g., through a user interface (UI) or other interface).

The computing device 504 and/or the service provider computers 505 may be any type of computing device such as, but not limited to, a mobile phone, a smartphone, a personal digital assistant (PDA), a laptop computer, a desktop computer, a thin-client device, a tablet computer, a smart watch, a wireless headset, or the like. As noted, the service provider computers 505 may be in communication with the computing device 504 via the networks 508, or via other network connections.

In one illustrative configuration, the computing device 504 may include at least one memory 514 and one or more processing units (or processor(s)) 516. The processor(s) 516 may be implemented as appropriate in hardware, computer-executable instructions, or combinations thereof. Computer-executable instruction or firmware implementations of the processor(s) 516 may include computer-executable or machine-executable instructions written in any suitable programming language to perform the various functions described. The computing device 504 may also include geo-location devices (e.g., a global positioning system (GPS) device or the like) for detecting, providing, and/or recording geographic location information associated with the computing device 504, the content items, and/or the user.

The memory 514 may store program instructions that are loadable and executable on the processor(s) 516, as well as data generated during the execution of these programs. Depending on the configuration and type of the computing device 504, the memory 514 may be volatile (such as random access memory (RAM)) and/or non-volatile (such as read-only memory (ROM), flash memory, etc.). The computing device 504 may also include additional removable storage and/or non-removable storage 526 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 514 and the additional storage 526, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 514 and the additional storage 526 are both examples of non-transitory computer storage media. Additional types of computer storage media that may be present in the computing device 504 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 504. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 504 may also contain communications connection(s) 528 that allow the computing device 504 to communicate with a data store, another computing device (e.g., the user device 502) or server, user terminals and/or other devices via the networks 508. The computing device 504 may also include I/O device(s) 530, such as a keyboard, a mouse, a pen, a voice input device, a touch input device, a display, speakers, a printer, etc. For example, utilizing a speaker and microphone, the computing device 504 may be configured to answer an incoming telephone call.

Turning to the contents of the memory 514 in more detail, the memory 514 may include an operating system 532 and/or one or more application programs or services for implementing the features disclosed herein including a user interface module 534, a library module 536, and/or a view model module 538. In some examples, the user interface module 534 may be configured to manage the user interface of the computing device 504. For example, the user interface module 538 may present the content scrubber, video scrubber, and/or main image areas described above. Further, the user interface module 538 may be configured to present one or more options for configuring the content scrubber interfaces. Additionally, in some examples, the user interface module 538 may be configured to receive and/or interpret user gesture information (e.g., via touch screen) for interacting with the content items. For example, a user may swipe an image or a thumbnail to change or otherwise animate the content scrubber.

The library module 536, in some cases, may be configured to store the content items locally. In this example, the content items (e.g., video files, image files, etc.) may be stored on the computing device 504 and managed in one or more folders of a user library. When the user interface module 534 requests a content item for presentation, it may first request that content item from the library module 536. In some examples, the view model module 538 may be configured manage the current state of each UI component. As noted, the view model module 538 may enable the UI components to present and/or animate images synchronously with the other UI components independent of knowledge of the other UI components.

While many of the examples herein are described with reference to the computing device 504 being a mobile phone, it should be understood that any type of computing device may be used to perform the functions/embodiments described, as appropriate. For example, the computing device 504 may be a smart watch, a wireless headset or earpiece, or other computing device that can collect, store, and/or present digital content. In some instances, the computing device 504 may also be equipped a microphone and speaker(s). As such, the computing device 504 (as described above) may be configured for answering incoming phone calls on behalf of a user device (e.g., a mobile phone).

The service provider computers 505 may also be any type of computing device. In one illustrative configuration, the service provider computers 505 may include at least one memory 542 and one or more processing units (or processor (s)) 544. The processor(s) 544 may be implemented as appropriate in hardware, computer-executable instructions, or combinations thereof. Computer-executable instruction or firmware implementations of the processor(s) 544 may include computer-executable or machine-executable instructions written in any suitable programming language to perform the various functions described.

The memory 542 may store program instructions that are loadable and executable on the processor(s) 544, as well as data generated during the execution of these programs. Depending on the configuration and type of the service provider computers 505, the memory 542 may be volatile (such as RAM) and/or non-volatile (such as ROM, flash memory, etc.). The service provider computers 505 may also include additional removable storage and/or non-removable storage 546 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 542 may include multiple different types of memory, such as SRAM, DRAM, or ROM. While the volatile memory described herein may be referred to as RAM, any volatile memory that would not maintain data stored therein once unplugged from a host and/or power would be appropriate. The memory 542 and the additional storage 546, both removable and non-removable, are both additional examples of non-transitory computer-readable storage media.

The service provider computers 505 may also contain communications connection(s) 548 that allow the service provider computers 505 to communicate with a data store, another computing device or server, user terminals and/or other devices via the networks 508. The service provider computers 505 may also include I/O device(s) 550, such as a keyboard, a mouse, a pen, a voice input device, a touch input device, a display, speakers, a printer, etc.

Turning to the contents of the memory 542 in more detail, the memory 542 may include an operating system 552 and/or one or more application programs or services for implementing the features disclosed herein including a library module 554 and/or a view model module 556. In some examples, the library 554 may be configured to manage or otherwise store content items for the user (e.g., in the cloud). In this way, the computing device 504 need not store the content items locally, and when one or more content items are desired or requested for presentation, the computing device 504 may request the respective items from the library module 554 of the service provider computers 505. In some cases, the library module 554 may operate much like the library module 536 of the computing device 504, except for instances when the service provider computers 505 are expected to store or otherwise manage the content items. In other words, the service provider computers 505 may act as a sort of web service that the computing device 504 can, on occasion, call on (e.g., utilizing one or more application programming interface (API) method calls) to act as a cloud library of the computing device 504. Similarly, the view model module 556 may be configured to aid in the service provider computers' 505 ability to act as a web service in that it may be configured to manage the state of each UI component on behalf of the computing device 504. In that case, the service provider computers 505 may then provide the appropriate messages back to the computing device 504 for presentation to the user as appropriate.

Figure 6:
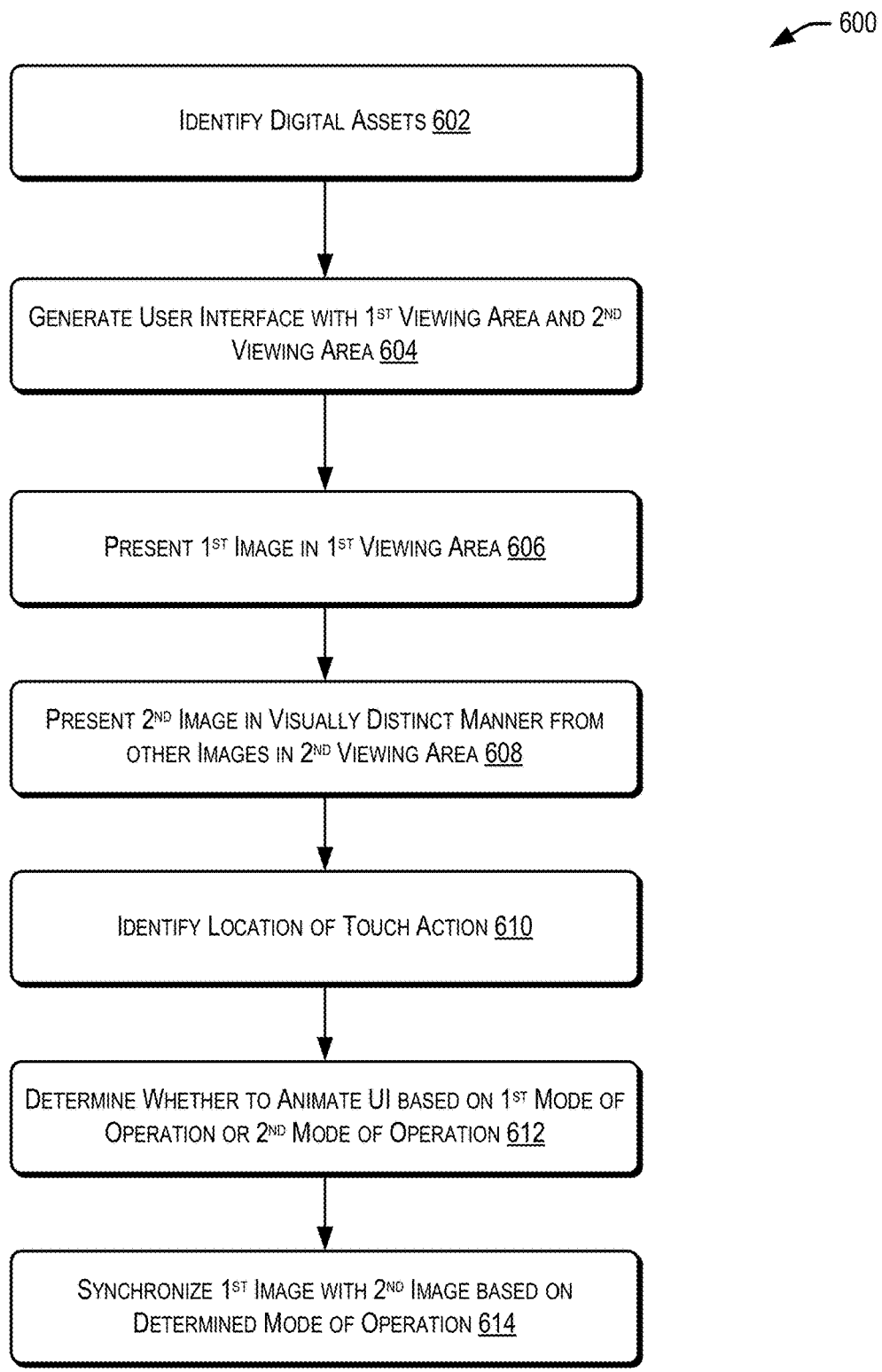
FIG. 6 is a simplified flow diagram illustrating an example process for providing a synchronized content scrubber as described herein, according to at least one example.
Figure 7:
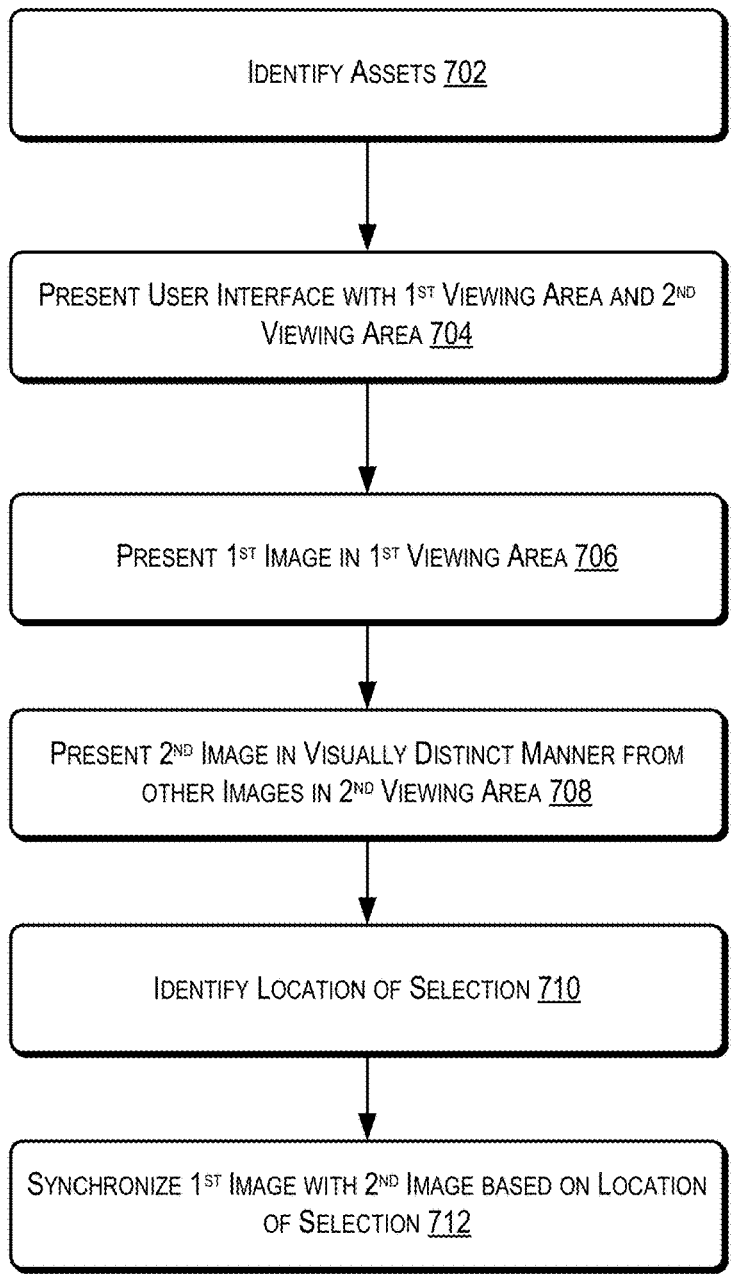
FIG. 7 is another simplified flow diagram illustrating another example process for providing a synchronized content scrubber as described herein, according to at least one example.

FIGS. 6 and 7 illustrate example flow diagrams showing respective processes 600 and 700 for presenting a synchronized content scrubber, as described herein. These processes 600 and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, the process 600 may be performed by the computing device 504 of FIG. 5 (e.g., utilizing at least the user interface module 534 and/or the view model module 538 shown in FIG. 5. The process 600 may begin at 602 where digital assets may be identified. Digital assets may include image files, video files, audio files, image burst files, combinations of the foregoing, or the like. At 604, the process 600 may include generating a user interface with a first viewing area and a second viewing area. The first viewing area may be presented above the second the viewing area. Additionally, the second viewing area may be configured to present a content scrubber for presenting at least a subset of the identified assets. At 606, the process 600 may include presenting a first image in the first viewing area. At 608, the process 600 may include presenting a second image in the second viewing area. Other images of the user or library may also be presented in the second viewing area along with the second image. In some examples, the first image and the second image may correspond to representations of the same content item. For example, one of the images in the second viewing area may be a thumbnail representation of a baseball. Similarly, the image presented in the first viewing area may be a larger image that represents the same baseball. In some examples, the thumbnail image of the baseball in the second viewing area may be presented in a visually distinctive manner from the other items in the second viewing area.

At 610, the process 600 may include identifying a touch action (e.g., on a touch screen of the computing device) and/or a location of the touch action. For example, touch action may be detected in the first viewing area or the in the second viewing area. At 612, the process may include determining whether to animate the user interface based at least in part on a first mode of operation or a second mode of operation. The first and/or second modes of operation may be different based at least in part on which portion of the user interface was touched. For example, some actions may occur when the user touches the first viewing are, while other actions may occur when the user touches the second viewing area. At 614, the process 600 may end by synchronizing the first image with the second image based at least in part on the determined mode of operation For example, as noted, if it is determined to operate under the first mode of operation one action/animation might occur, while if it is determined to operate under the second mode of operation a different action/animation might occur.

FIG. 7 illustrates another process 700 for providing a synchronized content scrubber, according to at least a few embodiments. In some examples, the process 700 may be performed by the computing device 504 of FIG. 5 (e.g., utilizing at least the user interface module 534 and/or the view model module 538 shown in FIG. 5. The process 700 may begin at 702 where the process 700 may include identify assets for presentation. At 704, the process 700 may include presenting a user interface with a first viewing area and a second viewing area. At 706, the process 700 may include presenting a first image in the first viewing area. At 708, the process 700 may include presenting a second image in the second viewing are. In some instances, the second image may be presented in a visually distinct manner from all other images presented in the second viewing area. At 710, the process 700 may include identifying a location of a selection (e.g., from a user). Further, the process 700 may end at 712, where the process 700 may include synchronizing the first image with the second image based at least in part on the location of the selection.

Illustrative methods and systems for providing a synchronized content scrubber are described above. Some or all of these systems and methods may, but need not, be implemented at least partially by architectures such as those shown at least in FIGS. 1-7 above. While many of the embodiments are described above with reference to images and videos, it should be understood that any type of electronic content may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers.

The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by an electronic device with a display, comprising:
   presenting, in a first viewing area of a user interface, a first image that represents a video asset of a plurality of digital assets;
   presenting, in a second viewing area, a content scrubber bar comprising a plurality of additional images that respectively represent the plurality of digital assets;
   identifying a first touch input within the content scrubber bar that identifies a selection of a second image of the plurality of additional images, the second image representing the video asset;
   in response to the first touch input, presenting, in the content scrubber bar, an expanded representation of the second image that represents the video asset, the expanded representation of the second image comprising representations of a plurality of frames of the video asset, wherein presenting the expanded representation of the second image comprises expanding, in response to the first touch input, the representations of the plurality of frames of the video asset to a wider aspect ratio than other representations of the plurality of additional images in the content scrubber bar;
   identifying a second touch action within the content scrubber bar that identifies a selection of at least one other image presented in the second viewing area; and
   in response to the second touch action, collapsing the expanded representation of the second image that represents the video asset.

2. The computer-implemented method of claim 1, wherein the content scrubber bar is configured to enable images of the plurality of digital assets to appear to move in or out of ends of the content scrubber bar as the second image changes within the content scrubber bar.

3. The computer-implemented method of claim 2, wherein the content scrubber bar is further configured to present a video scrubber interface for horizontally scrolling through the plurality of frames of the video asset of the plurality of digital assets, the video scrubber interface presented adjacent to the at least one other image that represents the plurality of digital assets presented in the content scrubber bar.

4. The computer-implemented method of claim 1, wherein the expanded representation of the second image that represents the video asset is presented in a visually distinct manner from other images that represent at least a subset of the plurality of digital assets that are also presented in the content scrubber bar, and wherein the visually distinct manner of presentation of the expanded representation of the second image comprises presenting the second image with buffering content on either side of the second image such that the second image is presented spaced further from the other images than the other images are spaced from each other.

5. The computer-implemented method of claim 1, wherein the first image in the first viewing area is changed to a different image in response to selection of the at least one other image.

6. A computer-readable storage medium storing computer-executable instructions that, when executed by a processor, configure the processor to perform operations comprising:
   presenting a first image, in a first viewing area, that represents a video asset of a plurality of digital assets;
   presenting, in a second viewing area, a content scrubber bar comprising a plurality of additional images that respectively represent the plurality of digital assets;
   identifying a first touch input within the content scrubber bar that identifies a selection of a second image of the plurality of additional images, the second image representing the video asset;
   in response to the first touch input, presenting, in the content scrubber bar, an expanded representation of the second image that represents the video asset of the plurality of digital assets, the expanded representation of the second image comprising representations of a plurality of frames of the video asset, wherein presenting the expanded representation of the second image comprises expanding, in response to the first touch input, the representations of the plurality of frames of the video asset to a wider aspect ratio than other representations of the plurality of additional images in the content scrubber bar;
   identifying a second touch action within the content scrubber bar that identifies a selection of at least one other image presented in the second viewing area; and
   in response to the second touch action, collapsing the expanded representation of the second image that represents the video asset.

7. The computer-readable medium of claim 6, wherein the content scrubber bar is configured to enable images of the plurality of assets to appear to move in or out of ends of the content scrubber bar as the second image changes within the content scrubber bar.

8. The computer-readable medium of claim 6, wherein each image representing a respective asset of the subset of the plurality of assets that is also presented in the content scrubber bar is not presented in a visually distinct manner from each other.

9. The computer-readable medium of claim 8, wherein the first image represents at least one of the subset of the plurality of assets that is not presented in the visually distinct manner from each other.

10. The computer-readable medium of claim 6, wherein at least one of the plurality of assets comprises at least one of an image file, a video file, an audio file, or a set of image files.

11. The computer-readable medium of claim 6, wherein the first image or the second image comprise thumbnail representations of at least one of the plurality of assets.

12. The computer-readable medium of claim 6, wherein the content scrubber bar is further configured to present a video scrubber interface for horizontally scrolling through the plurality of frames of the video asset of the plurality of digital assets, the video scrubber interface presented adjacent to the at least one other image that represents the plurality of digital assets presented in the content scrubber bar.

13. The computer-readable medium of claim 6, wherein the expanded representation of the second image that represents the video asset is presented in a visually distinct manner from other images that represent at least a subset of the plurality of digital assets that are also presented in the content scrubber bar, and wherein the visually distinct manner of presentation of the expanded representation of the second image comprises presenting the second image with buffering content on either side of the second image such that the second image is presented spaced further from the other images than the other images are spaced from each other.

14. A device configured to present content in a user interface, comprising:
   a touch screen configured to receive touch input;
   a memory configured to store computer-executable instructions; and
   a processor in communication with the memory and the touch screen, the processor configured to execute the computer-executable instructions to at least:
      present a first image, in a first viewing area, that represents a video asset of a plurality of digital assets;
      present, in a second viewing area, a content scrubber bar comprising a plurality of additional images that respectively represent the plurality of digital assets;
      identify, by the touch screen, a first touch input within the content scrubber bar that identifies a selection of a second image of the plurality of additional images, the second image representing the video asset;
      in response to the first touch input, present, in the content scrubber bar, an expanded representation of the second image that represents the video asset of the plurality of digital assets, the expanded representation of the second image comprising representations of a plurality of frames of the video asset, wherein presenting the expanded representation of the second image comprises expanding, in response to the first touch input, the representations of the plurality of frames of the video asset to a wider aspect ratio than other representations of the plurality of additional images in the content scrubber bar;
      identify, by the touch screen, a second touch action within the content scrubber bar that identifies a selection of at least one other image presented in the second viewing area; and
      in response to the second touch action, collapsing the expanded representation of the second image that represents the video asset.

15. The device of claim 14, wherein the content scrubber bar is configured to enable images of the plurality of assets to appear to move in or out of ends of the content scrubber bar as the second image changes within the content scrubber bar.

16. The device of claim 14, wherein the first image and the second image represent a same asset, wherein the first image is presented in the first viewing area based at least in part on an aspect ratio of the same asset, and wherein the second image is presented in the content scrubber bar based at least in part on an aspect ratio of other images presented in the content scrubber bar.

17. The device of claim 14, wherein the expanded representation of the second image that represents the video asset is presented in a visually distinct manner from other images that represent at least a subset of the plurality of digital assets that are also presented in the content scrubber bar, and wherein the visually distinct manner of presentation of the expanded representation of the second image comprises presenting the second image with buffering content on either side of the second image such that the second image is presented spaced further from the other images than the other images are spaced from each other.

* * * * *